United States Patent [19]
Keck et al.

[11] Patent Number: 6,088,494
[45] Date of Patent: Jul. 11, 2000

[54] APERIODIC MACH-ZEHNDER OPTICAL FILTERS

[75] Inventors: Donald B. Keck, Big Flats; William J. Miller, Corning; Robert A. Modavis, Painted Post; Daniel A. Nolan, Corning, all of N.Y.

[73] Assignee: Corning Incorporated, Corning, N.Y.

[21] Appl. No.: 09/290,143

[22] Filed: Apr. 13, 1999

Related U.S. Application Data

[62] Division of application No. 08/981,169, filed as application No. PCT/US97/06002, Apr. 11, 1997, Pat. No. 5,946,432
[60] Provisional application No. 60/016,055, Apr. 18, 1996.
[51] Int. Cl.[7] .............................. G02B 6/26; G02B 6/42
[52] U.S. Cl. ............................................................ 385/27
[58] Field of Search ................................ 372/6; 359/179; 385/24, 27, 43, 140

[56] References Cited

U.S. PATENT DOCUMENTS

| | | | |
|---|---|---|---|
| 5,295,205 | 3/1994 | Miller et al. | 385/1 |
| 5,351,325 | 9/1994 | Miller et al. | 385/42 |
| 5,400,417 | 3/1995 | Allie et al. | 385/2 |
| 5,537,671 | 7/1996 | Toyama et al. | 372/6 |
| 5,557,442 | 9/1996 | Huber | 359/179 |
| 5,703,975 | 12/1997 | Miller et al. | 372/6 |

OTHER PUBLICATIONS

Electronics Letters, Oct. 12, 1989, vol. 25, No. 21, "Unbalanced Dissimilar–Fibre Mach–Zehnder Interferomoter: Application as Filter", p. 1416–17, Malo et al.

"Variable bandwidth and tunable centre frequency filter using transversal–form programmable optical filter", Pawlowski et al., Electronic Letters, vol. 32, No. 2, Jan. 18, 1966, pp. 113–114.

23rd European Microwave Conf. Proc. p. 744–746, U.K. 1993. No month.

Fiber Optic Communications, Third Edition, 1992 Joseph C. Palaris, "Light Sources", pp. 162–163.

*Primary Examiner*—Teresa Arroyo
*Assistant Examiner*—Robert E. Wise
*Attorney, Agent, or Firm*—Mary Y. Redman; Edward F. Murphy

[57] ABSTRACT

A Mach-Zehnder filter is provided with a strongly aperiodic transfer function including a broad, sharply defined pass band. The filter can be used in conjunction with optical amplifiers.

3 Claims, 6 Drawing Sheets

APERIODIC MACH-ZEHNDER OPTICAL FILTERS

This is a divisional of application Ser. No. 08/981,169, now U.S. Pat. No. 5,946,432 filed Dec. 11, 1997. This application claims priority to and incorporates herein by reference U.S. Provisional Application Number 60/016,055 filed Apr. 18, 1996, PCT Application Number PCT/US97/06002 filed Apr. 11, 1997, and U.S. patent application Ser. No. 08/981,169 filed Dec. 11, 1997.

BACKGROUND OF THE INVENTION

The present invention relates to wavelength-selective devices usable in optical communication systems.

Optical fiber communication systems utilize wavelength-selective devices for various purposes as, for example, for routing light beams of different wavelengths to different destinations or as optical filters which allow light in a desired band of wavelengths to pass along the communication channel while removing or attenuating light at wavelengths outside of the desired band.

Wavelength-selective devices must meet demanding requirements for use in practical communications systems. The devices should be capable of separating wavelengths differing from one another by only a few nanometers. The wavelength-selective device should be environmentally stable, reliable and durable. Also, the wavelength-selective device should operate with a relatively low loss of optical power, i.e., the device should not dissipate substantial amounts of the optical power supplied to it in the desired wavelength bands.

Figure 1:
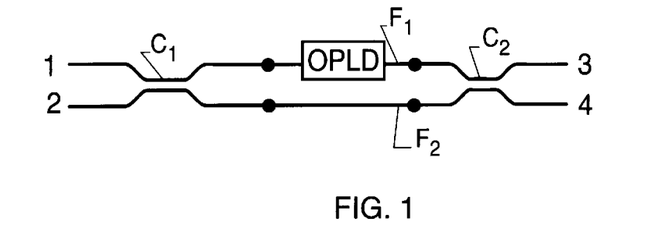
FIG. 1 is a schematic diagram of a conventional Mach-Zehnder optical device.

Mach-Zehnder interferometers have been utilized as wavelength-selective devices in optical communication systems. As depicted in FIG. 1, a conventional Mach-Zehnder interferometer includes a pair of fibers F1 and F2.

The fibers are coupled to one another at a first coupler C1 and a second coupler C2. The couplers are arranged to transfer light from one fiber to the other. As further explained below, the couplers may be so-called overclad tapered couplers in which narrowed, elongated portions of the fibers are closely juxtaposed with one another within a matrix or outer cladding. The couplers may be 3 dB couplers, arranged to transfer approximately one-half of the optical power supplied on one fiber to the other fiber. Fibers F1 and F2 have phase shift regions with different optical path lengths disposed between the couplers. Thus, the optical path length over the phase shift region in fiber F1 is different from the optical path length over the phase shift region in fiber F2. As used in this disclosure, the term "optical path length" is a measure of the time required for light at a given wavelength and in a given propagation mode to pass through the fiber from one end to the other. The optical path length difference has been provided by making the phase shift region of one fiber physically longer than the other, by making the two fibers F1 and F2 with different propagation constants so that the phase velocity of light within the two fibers is different, or both. The fibers can be provided with different propagation constants by making the fibers with different refractive index profiles. Where the fibers are "step-index" fibers, incorporating a core having a relatively high refractive index and a cladding with a relatively low refractive index overlying the core, the two fibers may have cores of different refractive indices, different core diameters, different cladding refractive indices or some combination of these. Regardless of the particular mechanism used to produce the optical path length difference, the single stage Mach-Zehnder filter depicted in FIG. 1 will direct light supplied through input 1 either to output 3 or to output 4 depending upon the wavelength of the light.

Figure 2:
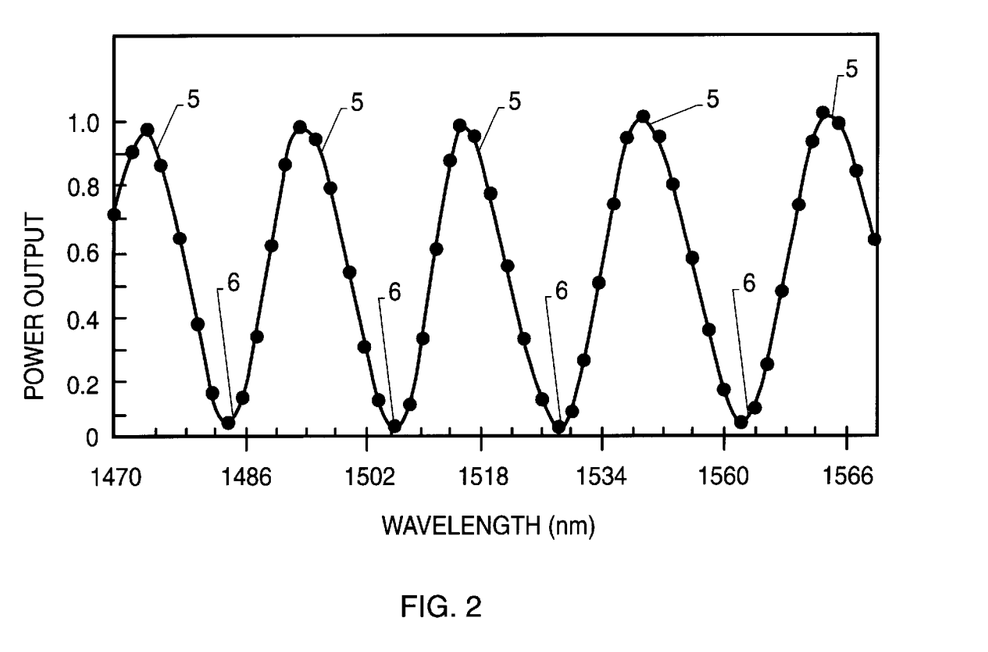
FIG. 2 is a graph illustrating the periodic variation in the transfer function relating light transmission to wavelength in the device illustrated in FIG. 1.

A typical single stage Mach-Zehnder filter has a substantially periodic transfer function relating the proportion of light directed to a particular output port to the wavelength of the light. That is, the amount of light appearing at any particular output port varies repetitively as the wavelength of the light varies. A typical transfer function for a single stage Mach-Zehnder device is illustrated in FIG. 2. It includes a series of alternating pass bands 5 and notches 6. At wavelengths within the pass bands, a substantial portion of the light supplied through port 1 is present at port 3; at wavelengths in notches 6, little or none of the light supplied through port 1 reaches port 3. The transfer function is periodic in that the pass bands and notches recur at substantially regular intervals along the wavelength axis. Although various characteristics can be achieved by coupling plural Mach-Zehnder devices in series, or by making each device with more than two optical path lengths, further improvements would be desirable.

In particular, there are needs for optical filters which will pass substantially all of the light within a single, relatively broad band of wavelengths, commonly referred to as a "pass band" and which will sharply attenuate light wavelengths lying just outside of the pass band. This need arises particularly in connection with optical amplifiers. An optical amplifier is a device which adds power to an optical signal. It is used principally to compensate for power lost in transmission through longer optical fibers. One form of an optical amplifier is known as an erbium-doped fiber amplifier (EDFA). The EDFA includes a length of fiber optic formed from special glass materials containing the element erbium. The input optical signal light beam, at a wavelength used for signal transmission is passed into the fiber along with light at another, shorter wavelength referred to as "pumping" light. Energy from the pumping light is absorbed and stored in the fiber. As the signal light beam passes through the fiber, this energy is released and incorporated into the signal light beam. Erbium-doped fiber amplifiers can be used with wavelengths in an operating band centered at about 1.55 micrometers. Ordinarily, the useful operating band of the amplifier is about 30 nm (0.03 micrometer) wide or more. Thus, the useful operating band of the amplifier may encompass wavelengths from about 1.53 micrometers to about 1.56 micrometers. This operating band is broad enough to permit simultaneous amplification of several different light beams at slightly different wavelengths.

Unfortunately, the EDFA also provides some amplification to light at wavelengths slightly outside of its useful operating band. Stated another way, the EDFA gain curve does not have a sharp cutoff at the edges of the operating band. Thus, where the incoming signal incorporates spurious components or "noise" at wavelengths slightly outside of the useful operating band, these spurious components will be amplified to some degree as well. Moreover, the amplifier itself can introduce noise at wavelengths that are slightly outside of the operating band. In both cases, the amplified noise passes downstream in the system and degrades system performance. Moreover, the optical energy taken from the fiber to amplify the noise is not available to amplify the desired signal. Thus, there is a substantial need for a simple filter which can be applied at the input or output of an EDFA to suppress signals lying slightly outside of the desired operating band of the EDFA, but which will pass substantially all of the wavelengths within the desired operating band without substantially attenuating them. In particular, there is a need for filters which can pass wavelengths from about 1.549 to about 1.565 micrometers while also suppressing signals with wavelengths from about 1.525 to about 1.545 micrometers. There are corresponding needs for optical filters with broad pass bands and sharp attenuation of wavelengths slightly outside of a desired pass band for use with other types of optical amplifiers and for use with other devices as well. There are also needs for the inverse type of filter, i.e., a filter which will suppress light at wavelengths within a broad band, but which will provide essentially unattenuated passage of light lying slightly outside of such band.

SUMMARY OF THE INVENTION

The present invention addresses these needs.

One aspect of the present invention provides a Mach-Zehnder interferometric device including an input port, an output port, an input end coupler and an output end coupler. The device further includes first and second optical paths extending between the couplers. The input end coupler is adapted to direct light applied at the input port to the first and second optical paths whereas the output end coupler is adapted to combine light on the first and second output paths and direct the combined light to the output port. The paths have optical path lengths $l_1$ and $l_2$ respectively between the couplers. At least one of the path lengths varies nonlinearly with the wavelength $\lambda$ of light passing through this path. The variation of the optical path lengths with wavelength is selected so that in the vicinity of an operating wavelength $\lambda_0$, the transfer function relating the proportion of light supplied through the input port which appears at the output port, is substantially aperiodic and so that the transfer function includes a principal, relatively broad pass band or notch for which the value of the transfer function is near a minimum or near a maximum over a relatively broad range of wavelengths encompassing $\lambda_0$. The principal pass band or notch constitutes the broadest pass band or notch of the transfer function in the vicinity of $\lambda_0$. Most preferably, the principal pass band or notch has a half-maximum width $\alpha\lambda$ at least about twice the half-maximum width of the nearest adjacent pass band or notch. The required matters of variation in optical path lengths can be stated mathematically as $$\left|\frac{d(\Delta l)}{d\lambda}\right| \le A$$

and $$\left|\frac{d^2(\Delta l)}{d\lambda^2}\right| > B$$

where:

$\Delta l$ is $(l_1-l_2)$;

A is a maximum rate of change in the path length with wavelength and

B is a minimum curvature of path length with respect to wavelength.

Thus, the preferred devices according to this aspect of the invention have a lower rate of change in path length with respect to wavelength, but a high curvature of path length with respect to wavelength. Preferably, A is about $4\pi/\Delta\lambda$ or less and B is about $5/(\Delta\lambda)^2$ or more, where $\Delta\lambda$ is the width of the pass band or notch. Most preferably, at the operating wavelength, A is zero. The optical paths may be constituted by fibers or by other waveguides. In a particularly preferred arrangement, the first and second optical paths are constituted by first and second fibers, and the fibers extend through the couplers. A portion of one fiber extending beyond the input coupler constitutes the input port, whereas the portion of the same fiber, or the other fiber, extends beyond the output coupler and constitutes the output port. Alternatively, one or more additional fibers may form the input and output ports, and these additional fibers may be coupled to the first and second fibers at the input end and output end couplers. Most preferably, the couplers are overclad tapered couplers, wherein each fiber includes tapered coupling region and the tapered coupling regions of the fibers are juxtaposed with one another. The couplers further include an overcladding surrounding the tapered coupling regions of the fibers.

Preferably, the device includes a housing integral with the overcladdings of the couplers, the housing surrounding the fibers between the couplers. As disclosed, for example, in a commonly assigned U.S. Pat. No. 5,295,205, the monolithic, environmentally stable Mach-Zehnder device can be formed by placing the fibers through the bore of a glass tube, heating the glass tube, and collapsing the tube onto the fibers, and further heating and stretching the tube and fibers at two spaced apart locations to form the couplers. Most preferably, the couplers are arranged to direct substantially equal portions of the light applied through the input port through each of the two paths, although unequal division can also be utilized as discussed below.

Further aspects of the present invention provide optical systems incorporating Mach-Zehnder wavelength-selective devices having a sharply defined pass band as discussed above in series with an optical amplifier or other device, wherein the pass band of the Mach-Zehnder device is substantially aligned with the operating band of the amplifier or other device. As discussed below, the filter enhances the signal to noise ratio of the system.

Other objects, features and advantages of the present invention will be more readily apparent, via detailed description of the preferred embodiments set forth below, taken in conjunction with the accompanying drawings.

DETAILED DESCRIPTION OF THE PREFERRED EMBODIMENTS

A Mach-Zehnder interferometric device in accordance with one embodiment of the invention includes a first fiber 10 and a second fiber 12. Fibers 10 and 12 are step-index fibers. Thus, the fiber 10 includes a core 10a shown in broken lines in FIG. 3 and a cladding 10b overlying the core. Fiber 12 includes a similar core and cladding. Fibers 10 and 12 may be formed from conventional materials such as silica glasses with dopants or additives such as germania and fluorine to adjust the indices of refraction of the cores and claddings to the desired values. The fibers are disposed within an integral, glass tubular housing 14.

Figure 3:
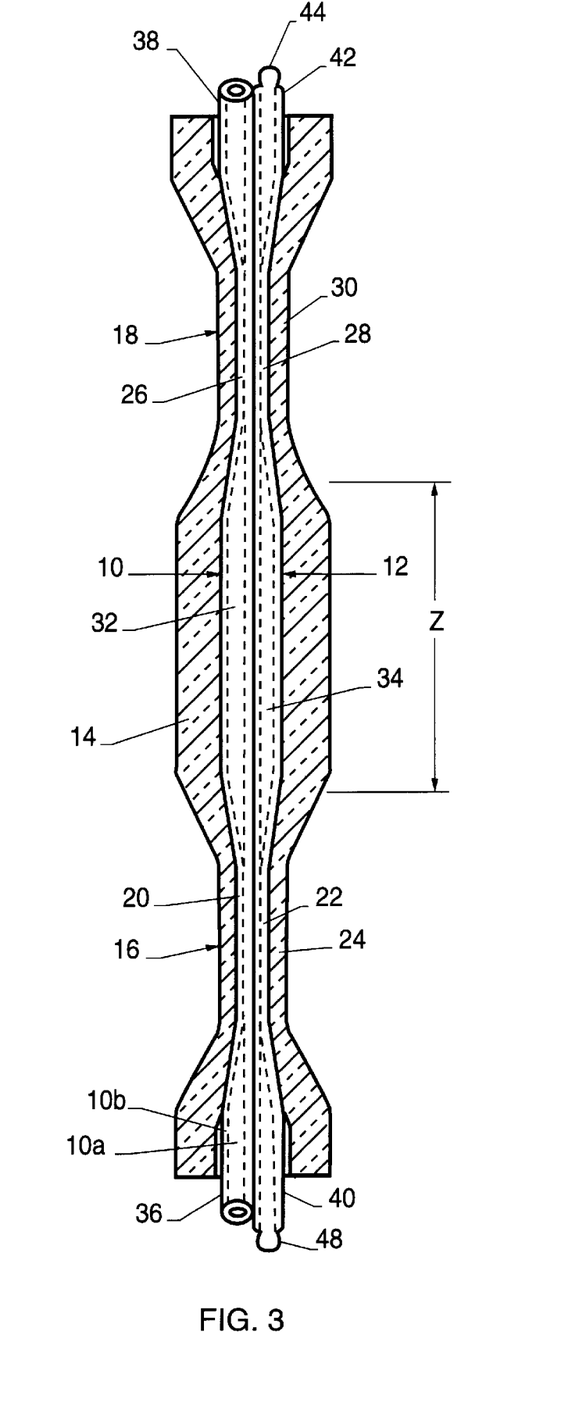
FIG. 3 is a diagrammatic view of a Mach-Zehnder device in accordance with one embodiment of the present invention.

Housing 14 and fibers 10 and 12 are elongated and narrowed to form a first overclad coupler 16 and a second overclad coupler 18. The first overclad coupler includes a narrowed coupling region 20 of fiber 10 extending side by side with a narrowed, tapered coupling region 22 of fiber 12. These coupling regions are encased in an overcladding 24 integral with housing 14. The second overclad coupler 18 includes similar tapered coupling regions 26 and 28 and overcladding 30. The couplers and housing may be fabricated by a process as disclosed in U.S. Pat. No. 5,295,205, the disclosure of which is hereby incorporated by reference herein. Briefly, as disclosed in the '205 patent, such a structure can be formed by placing the two fibers side by side inside tube 14 constituting the housing, heating and softening the tube and collapsing the tube onto the fibers. The process further includes heating the tube and fibers to an extent sufficient to soften the fibers at the locations which are to form the couplers. The tube and the fibers are stretched as a unit at the location of each coupling so as to elongate and narrow the tube and the fibers simultaneously. The two fibers 10 and 12 can have the same physical length z between couplers 16 and 18. Thus, fiber 10 has a central portion 32 defining a first path between the two couplers, whereas fiber 12 has a central portion 34 defining a path between the two couplers, both paths having the same physical length. Both of the fibers extend through the couplers to end regions disposed beyond the couplers. A first end region of the first fiber 10 provides a first input port 36, whereas the second end region 38 of the same fiber provides an output port at the opposite end of the device. The fiber end regions forming ports 36 and 38 are severed in the conventional manner to provide an end suitable to coupling to further fibers in the optical system. The end regions 40 and 42 of the second fiber provide further ports. However, these further ports are terminated by fusing the fiber tips to form antireflective ends. As disclosed, for example, in U.S. Pat. No. 4,979,972, the disclosure of which is also incorporated by reference herein, the antireflective termination can be formed by heating and pulling the fiber ends to sever it and further heating the fiber end to cause the glass to form a ball-like rounded end face having a diameter equal to or slightly smaller than the original outer diameter of the fiber cladding.

The two fibers have different optical properties. In particular, the pattern of change in the propagation constants of the two fibers with wavelength is selected so that the proportion of light supplied through input port 36 appearing at output port 38 varies with the wavelength of the applied light according to an aperiodic transfer function. That is, the transfer function relating the proportion of light appearing at output port 38 to the wavelength includes the features discussed above, such as a broad pass band or notch at a preselected range of wavelengths.

In general, for a Mach-Zehnder interferometric device, in which light is distributed evenly between the two paths, the proportion I of light which is applied at one input port appearing at an output port is a function of the wavelength:

$$I = \cos^2\left(\frac{\pi \Delta l}{\lambda}\right) \quad (1)$$

Where $\Delta l$ is the difference in optical path length between the two paths. The relationship between I and $\lambda$ is referred to herein as the "transfer function" of the device. For the device of FIG. 3, in which both paths have the same physical length z between the couplers:

$$I = \cos^2\left(\frac{\Delta \beta z}{2}\right) \quad (2)$$

Where:
I is the proportion of the light applied at input port 36 appearing at output port 38;
$\Delta \beta$ is the difference between the propagation constant $\beta_1$ of the first path 32 between the couplers and the propagation constant $\beta_2$ of the second path 34 between the couplers. "Propagation constant" is a measure of the phase velocity of the light along a path. For light propagating along a path defined by a fiber, the propagation constant varies with the wavelength $\lambda$ of the light. Variation of $\beta$ with $\lambda$ is commonly referred to as time delay. Under some conditions, light at a single wavelength can propagate through a single fiber in several different transmission modes, having different values of $\beta$. However, the preferred embodiments of the present invention utilize fibers with relatively small core diameters such that light can propagate in only a single mode, so that light at any wavelength has only one propagation constant $\beta$. The value of $\beta$ at any given value of $\lambda$ depends upon factors such as the relationship between the core diameter of the fiber and $\lambda$ and the refractive indices $n_1$ and $n_2$ of the core and cladding in the fiber. The refractive indices themselves may depend, to some extent, on $\lambda$.

Figure 4:
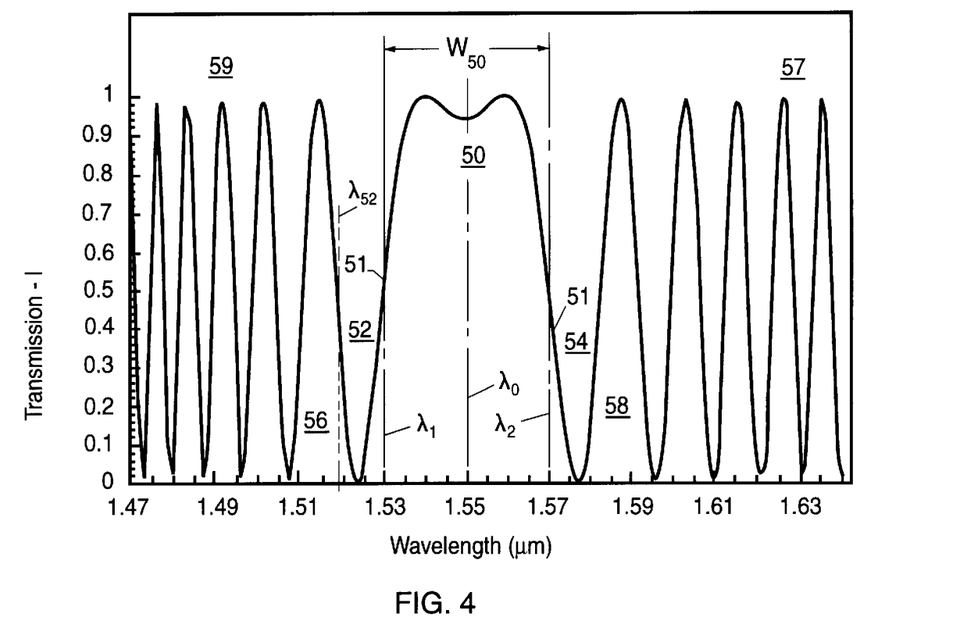
FIG. 4 is a graph depicting the transfer function of the device of FIG. 3.

If $\Delta \beta$ varies linearly with $\lambda$, then the transfer function I will have the periodic characteristic depicted in FIG. 2. As seen in FIG. 2, the period of the transfer function is constant; each of its peaks has essentially the same breadth. By contrast, devices according to preferred embodiments of the present invention, have transfer functions which are substantially aperiodic in wavelength. An aperiodic transfer function, as shown in FIG. 4, has a principal band 50 centered at an operating wavelength $\lambda_0$. Band 50 represents a group of wavelengths within which a relatively high proportion of the light applied at the input port appears at the output port, (I>0.5) and hence band 50 is referred to as a "pass band". The adjacent bands 52 and 54 are groups of wavelengths for which a low proportion of the light applied at the input port reaches the output port (I<0.5), and hence these adjacent bands are referred to as "notches". Bands 56 and 58 represent further pass bands. In the vicinity of $\lambda_0$, the widths of the bands change substantially with wavelength. Principal pass band 50 has width $W_{50}$ substantially greater than the width of the other bands. As used in this disclosure with reference to a pass band or notch, the term "width" means the width stated as the full-width half maximum or "FWHM" width. The limiting wavelengths of a band are taken as the wavelengths on either side of the band center at which I is halfway between the minimum or maximum value attained in the band in question and the minimum or maximum value in the next adjacent band. For example, principal pass band 50 has lower and upper limiting wavelengths $\lambda_1$ and $\lambda_2$, whereas notch 52 has limiting wavelengths $\lambda_{52}$ and $\lambda_1$. The width of a band is the difference between its limiting wavelengths. Thus, the width $\Delta\lambda$ of principal pass band 50 is $(\lambda_2-\lambda_1)$. The degree to which the transfer function is aperiodic can be stated as the ratio between the width of the principal band, with the greatest width, and the width of the next adjacent band. Preferably, this ratio is at least about 2.

To provide a substantially aperiodic transfer function with a broad pass band or notch centered at $\lambda_0$, $$\left| \frac{d(\Delta l)}{d\lambda} \right|$$

should be as small as possible, and less than a value A representing a maximum rate of change in the path length with wavelength. On the other hand, $$\left| \frac{d^2(\Delta l)}{d\lambda^2} \right|$$

should be large, and more than a value B representing a minimum second derivative or "curvature" of the path length with respect to wavelength. For a pass band or notch of width $\Delta\lambda$, and for typical fibers for which it is reasonable to approximate the variation of l with $\lambda$ as parabolic, A should be about $6\pi/\Delta\lambda$ or less, and preferably about $4\pi/\Delta\lambda$ or less, whereas B should be about $3/(\Delta\lambda)^2$ or more, and desirably about $5/(\Delta\lambda)^2$ or more.

For a device as shown in FIG. 3, wherein both paths have equal length z, and both paths have substantially uniform propagation constants over the entire path length z between the couplers, $\Delta l = \Delta\beta z$. The time delay characteristics ($\beta$ versus $\lambda$) for common fibers are known, and hence the values of $$\left| \frac{d(\Delta l)}{d\lambda} \right| \text{ and } \left| \frac{d^2(\Delta l)}{d\lambda^2} \right|$$

can be readily calculated for any pair of fibers.

Another way to state the rules for selection of fiber characteristics for the case where both paths have equal length z is as follows. First, to provide a principal pass band or notch of width $\Delta\lambda$, $$z = \frac{\pi}{\Delta\beta(\lambda_2) - \Delta\beta(\lambda_2)} \approx \frac{\pi}{\Delta\lambda} \left( \frac{d(\Delta\beta)}{d\lambda} \right)^{-1} \tag{3}$$

Substitution of this value for z into equation (2) yields $$I = \cos^2 \left[ \frac{\pi}{2\Delta\lambda} \left( \frac{\Delta\beta}{\frac{d(\Delta\beta)}{d\lambda}} \right) \right] \tag{4}$$

To provide the maximum variation in the period of the transfer function, the expression $d[\ldots]/d\lambda$ should be maximized, where [...] represents the bracketed argument of the cosine in equation (4). By differentiation, $$\frac{d[\ldots]}{d\lambda} = \frac{\pi}{2\Delta\lambda} \left[ 1 - \Delta\beta \frac{\frac{d^2(\Delta\beta)}{d\lambda^2}}{\left( \frac{d(\Delta\beta)}{d\lambda} \right)^2} \right] \tag{5}$$

By inspection in equation 5, this expression can be maximized by maximizing the product of $\Delta\beta$ and the second derivative of $\Delta\beta$ with respect to wavelength in the vicinity of the desired pass band or notch, and by minimizing the first derivative of $\Delta\beta$ with respect to wavelength in the vicinity of the desired pass band or notch.

Generalizing to the case of equal or unequal path lengths $z_1$ and $Z_2$, where $z_1$ is the length of one path and $Z_2$ is the length of the other path:

$$d(\Delta l)/d\lambda = z_1 d(\beta_1)/d\lambda - z_2 d(\beta_2)/d\lambda \tag{6}$$

This expression should be as small as possible, whereas $$d^2(\Delta l)/d\lambda^2 = z_1 d^2(\beta_1)/d\lambda^2 - Z_2 d^2(\beta_2)/d\lambda^2 \tag{7}$$

should be as large as possible. The terms $d^2(\beta_1)/d\lambda^2$ and $d^2(\beta_2)/d\lambda^2$ are proportional to the dispersion in the fibers constituting the paths. Stated another way, the dispersion in the paths, weighted by the path lengths, $z_1$ and $Z_2$, should be as different as possible for maximum aperiodicity.

Figure 6:
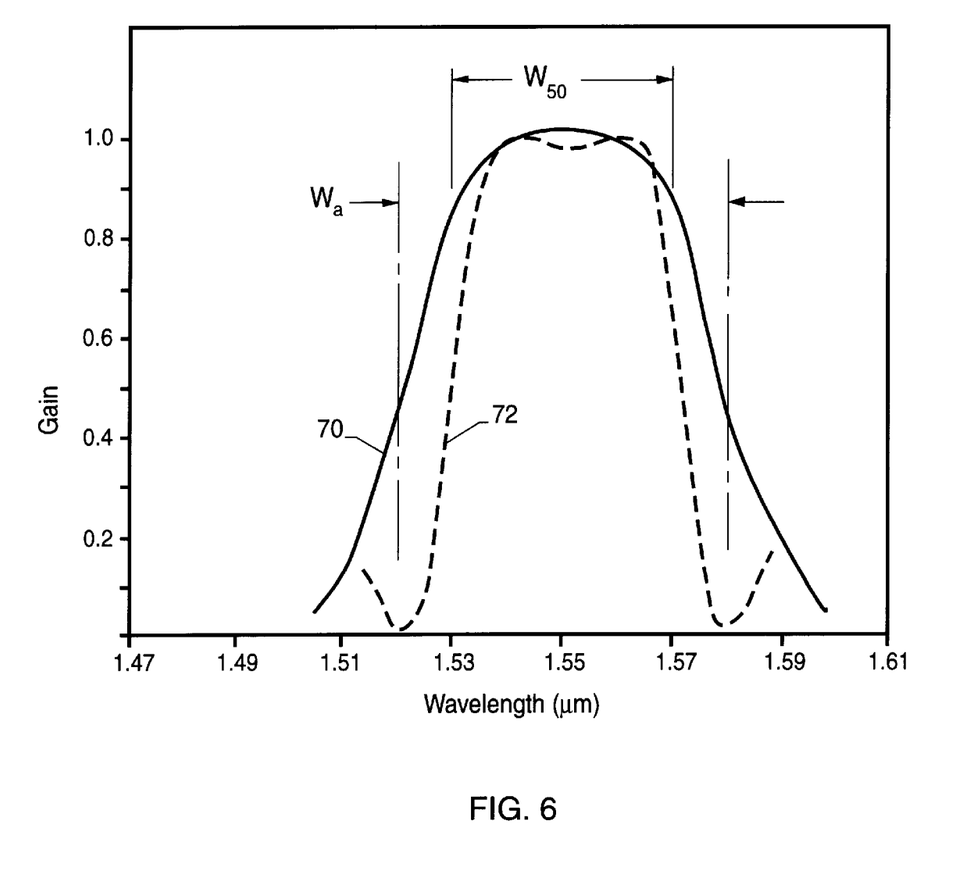
FIG. 6 is a graph depicting certain transfer functions associated with the system of FIG. 5.

Interferometric devices as discussed above can be utilized in conjunction with optical amplifiers. An optical amplifier system in accordance with a further embodiment of the invention includes a fiber amplifier which has a long section 60 of erbium doped fiber and an optical coupler or combiner 62 connected to one end of fiber 60. Combiner 62 has an input port 61 for receipt of incoming light signals. Combiner 62 also has a port 63 connected to a source of pumping radiation at about 1.48 $\mu$m wavelength, i.e., for example, the diode laser that operates at such wavelength. The opposite end of fiber 60 is connected to a conventional filter or wavelength-selective device such as a standard, periodic Mach-Zehnder filter adapted to block the pumping radiation, but to pass radiation at wavelengths in the operating band of the amplifier, in the vicinity of 1.55 $\mu$m. The output 65 of this filter constitutes the output connection of the amplifier. Such fiber amplifiers are well-known in the art. They are described, for example, in Palais, Fiber Optic Communications, third edition, pp. 162–163 (Prentice-Hall, Inc. 1992), the disclosure of which is hereby incorporated by reference herein. The amplifier provides a gain or ratio of power out at output 65 to power in at input 61 which is substantially greater than one for a relatively wide range of wavelengths centered at about 1.55 $\mu$m. A typical transfer function curve 70 relating the gain of the optical amplifier to wavelength is illustrated in FIG. 6. As shown, the gain curve has a half-maximum width of $W_a$. The maximum gain may be many orders of magnitude, i.e., up to about 40 dB.

Figure 5:
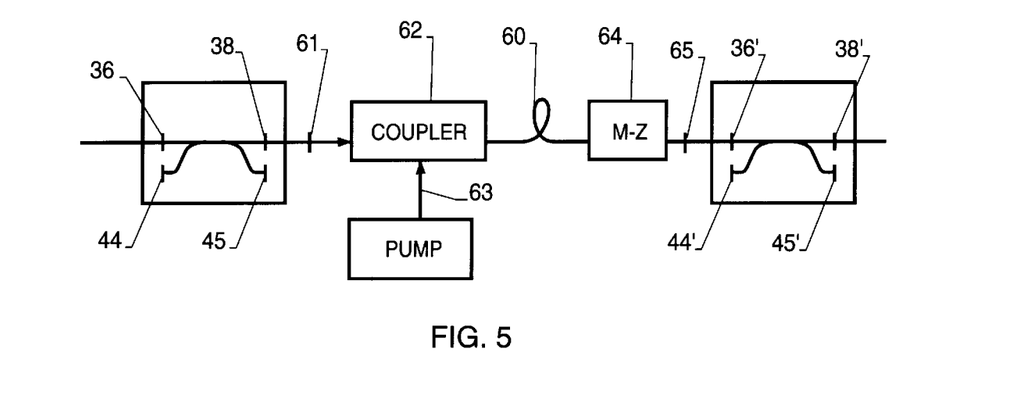
FIG. 5 is a diagrammatic view of an amplifier system in accordance with a further embodiment of the invention.

As illustrated in FIG. 5, one or more optical filters as discussed above, each having a principal pass band of width $W_{50}$, are connected in series with the amplifier. Thus, the first filter of the type discussed above may be connected in series with the input port so that the output port 38 of the filter is connected to the input port of the amplifier, whereas the input port 36[1] of a second filter as discussed above may be connected directly to the output port 65 of the filter. The composite device has a narrower, sharply defined gain curve 72 which is the product of the filter transfer functions I with the gain transfer function of the amplifier. The composite device provides essentially all of the gain provided by the amplifier itself for frequencies within the pass bands $W_{50}$ of the filter or filters, but provides a sharp cutoff for frequencies outside this range. Thus, where the incoming signal incorporates noise or unwanted signals at frequencies slightly outside of the filter pass band $W_{50}$, the filters substantially eliminate the unwanted signals. Also, where a filter is disposed ahead of the input port of the filter, the unwanted signals are eliminated before they can absorb power in the amplifier. Accordingly, the composite filter and amplifier provides superior performance when used in an optical communications system employing wavelengths within the filter pass band $W_{50}$. Moreover, the pass band of the filter $W_{50}$ includes a range of wavelengths broad enough to accommodate several wavelength division multiplexed amplitude-modulated signals or a wavelength-modulated signal. For service with erbium-doped fiber amplifiers, the principal passband desirably has a central wavelength of about 1.55 micrometers and a width of at least about 10 micrometers, preferably between about 10 and about 40 micrometers.

The composite gain function (FIG. 6) achieved by multiplying the filter transfer function (FIG. 4) by the gain transfer function 70 of the amplifier drops off rapidly at wavelengths far from the central wavelength $\lambda_0$ of the principal pass band. Where the filter is connected in series with an optical amplifier, the characteristics of the filter at wavelengths far outside of the gain band width $W_a$ of the amplifier, are essentially insignificant. Thus, the aperiodic transfer function of the filter alone (of FIG. 4) includes regions 57 and 59, at wavelengths remote from the central frequency of the principal pass band, wherein the transfer function fluctuates rapidly as a function of wavelength. This region of the filter transfer function is essentially eliminated by the gain characteristics of the amplifier. Stated another way, the filter transfer function is relied upon only to sharpen the cutoff of the central peak in the gain transfer function of the amplifier. More generally, the aperiodic Mach-Zehnder filter according to preferred embodiments of the present invention can be combined with another device having a relatively broad pass band, where the other device is effective to remove wavelengths in the rapidly fluctuating regions of the transfer function curve of the filter, but the other device has a relatively broad pass band encompassing the principal pass band of the aperiodic Mach-Zehnder filter. The aperiodic filter thus provides a sharper cutoff to the pass band of the other device.

Numerous variations and combinations of the features described above can be utilized without departing from the present invention. For example, in the filter of FIG. 3, port 42 formed by the second fiber could be configured as an output port in lieu of, or in addition to, the output port 38. The transmission transfer function for output port 42 is simply the inverse of the transmission transfer function for port 38. Thus, the principal band of the transfer function at port 42 would be a notch rather than a pass band.

It is not essential that the fibers forming the optical paths extend beyond the couplers, or that the input and output ports be constituted by the fibers forming the paths between the couplers. For example, the device illustrated in FIG. 7 has a fiber 111 defining the input port 136 and output port 138. Two other fibers 110 and 112 are coupled to fiber 111 at the input coupler 116 and output coupler 118. The couplers are arranged so that the light provided on fiber 111 through the input port 136 is coupled to fibers 110 and 112 in substantially equal proportions and so that the light from these fibers is recombined onto fiber 111. In this arrangement, that portion of fiber 111 extending between the couplers does not carry any appreciable portion of the light, and may be omitted. Multifiber couplers are known in the art and are described, for example, in commonly assigned U.S. Pat. No. 5,351,325, the disclosure of which is hereby incorporated by reference herein.

Figure 7:
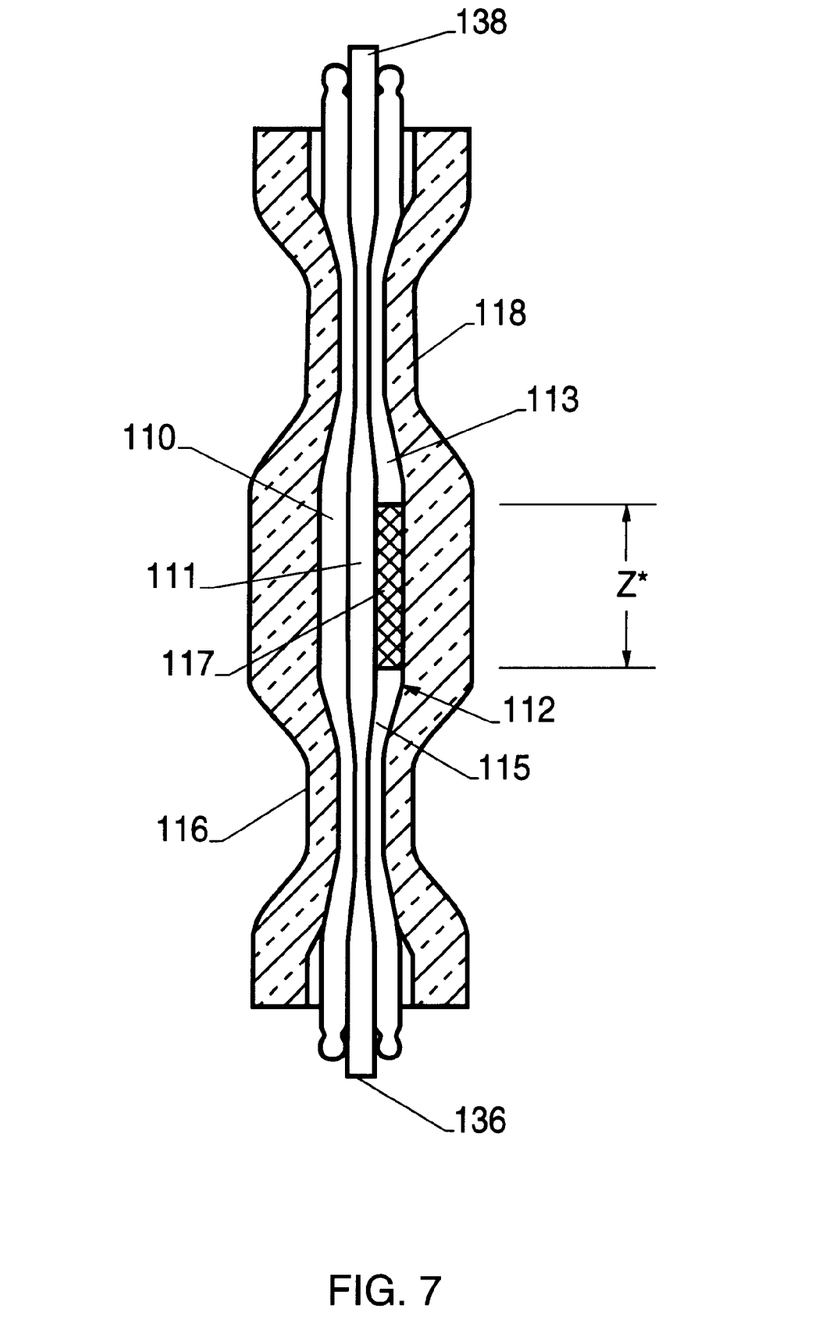
FIG. 7 is a view similar to FIG. 3, but depicting a device in accordance with yet another embodiment of the invention.

As also illustrated in FIG. 7, the fibers need not be of uniform composition. Thus, fiber 110 may be of a uniform composition whereas fiber 112 may include sections 113 and 115 having the same composition and configuration as fiber 110 and a further section 117 of different optical properties. As portions 113 and 115 do not influence $\Delta L$, only the length of section 117, and the corresponding length of fiber 110, need be considered in computation of the transfer function. A composite fiber could also be used in 2-fiber device as illustrated in FIG. 3. The use of composite fibers in Mach-Zehnder interferometric devices is disclosed, for example, in the commonly assigned U.S. patent application of William J. Miller entitled Mach-Zehnder Interferometric Devices with Composite Fibers, filed on even date herewith, the disclosure of which is hereby incorporated by reference herein.

Although the filter has been described by way of reference to paths formed by fiber optic waveguides, other waveguides can be used. For example, the filter can be formed using monolithic planar waveguides. Moreover, the couplers need not be overclad tapered couplers; other forms of couplers, such as polished-fiber and fused-fiber couplers can be used. Additionally, the couplers need not be 3dB couplers; couplers which provide unequal power distribution between the paths can be utilized. This approach can be utilized to reduce the size or modulation depth of the transmitted signal.

Figure 8:
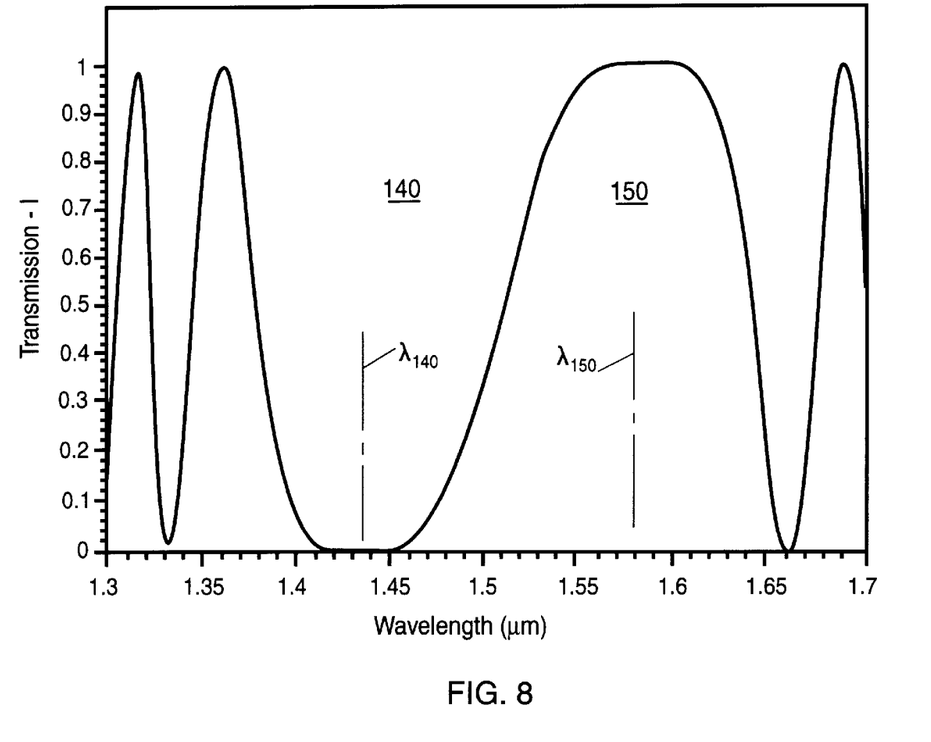
FIG. 8 is a graph depicting a transfer function for a system according to a further embodiment of the invention.

The transfer function of the filter may include more than one broad pass band or notch. As shown in FIG. 8, the transfer function may include a broad notch 140 centered at central wavelengths $\lambda_{140}$, in addition to the principal pass band 150 centered at principal wavelength $\lambda_{150}$. Such a transfer function can be achieved if $d(\Delta l)/d\lambda$ is zero or close to zero at both wavelengths $\lambda_{140}$ and $\lambda_{150}$, and if $d^2(\Delta l)/d\lambda^2$ is relatively large at both such wavelengths. Similarly, the device can have three or more relatively broad bands where these conditions are met at three or more wavelengths. In such an arrangement, the broadest of the broad bands can be regarded as the principal band discussed above. A filter with relatively broad notches on opposite sides of a principal pass band can be used as a wavelength-selective filter, as in a wavelength-division multiplexing system, and can also be used in conjunction with a device such as an optical amplifier as mentioned above.

EXAMPLE 1

A Mach-Zehnder filter substantially in accordance with FIG. 3 is formed from a first step fiber having a core radius of 3.80 micrometers and ($\Delta n$) 0.35%. The second fiber used in the filter has a core radius of 0.82 micrometers and (delta n)=1.80%. Used herein, the term "delta n" means $(n_1-n_2)/n_1$, where $n_1$ is the core refractive index and $n_2$ is the cladding refractive index. The physical path length between the input and output couplers is 23 cm. The transmission spectrum is as illustrated in FIG. 4. $\lambda_1$ is about 1.53 $\mu$m, whereas $\lambda_2$ is about 1.57 $\mu$m. $\lambda_0$ is about 1.55 $\mu$m.

What is claimed is:

1. An optical system comprising an optical device having an optical device transfer function with a device pass band connected in series with a Mach-Zehnder interferometric filter having a substantially aperiodic filter transfer function defining a principal pass band broader than other pass bands of such transfer function, said principal pass band of said filter transfer function being encompassed within said device pass band and having sharper cutoff than said device pass band.

2. A system as claimed in claim 1 wherein said aperiodic filter transfer function includes a fluctuating region in which a value of the filter transfer function fluctuates rapidly between maximum and minimum values as the wavelength of transmitted light changes, and wherein said optical device transfer function has values less than 0.5 for wavelengths in said fluctuating region of said filter transfer function.

3. A system as claimed in claim 2 wherein said device is an optical amplifier.

* * * * *